(12) United States Patent
Mei et al.

(10) Patent No.: US 9,275,322 B2
(45) Date of Patent: Mar. 1, 2016

(54) STRETCHABLE MULTI-LAYER WEARABLE TAG CAPABLE OF WIRELESS COMMUNICATIONS

(71) Applicant: VivaLnk Limited (Cayman Islands), Santa Clara, CA (US)

(72) Inventors: Junfeng Mei, Sunnyvale, CA (US); Jie Li, Cupertino, CA (US)

(73) Assignee: VivaLnk Limited (Cayman Islands), Santa Clara, CA (US)

( * ) Notice: Subject to any disclaimer, the term of this patent is extended or adjusted under 35 U.S.C. 154(b) by 82 days.

(21) Appl. No.: 14/454,457

(22) Filed: Aug. 7, 2014

(65) Prior Publication Data

US 2015/0144702 A1 May 28, 2015

Related U.S. Application Data

(60) Provisional application No. 61/908,258, filed on Nov. 25, 2013, provisional application No. 61/934,724, filed on Feb. 1, 2014, provisional application No. 62/016,953, filed on Jun. 25, 2014.

(51) Int. Cl.
*G06K 19/077* (2006.01)

(52) U.S. Cl.
CPC ................... *G06K 19/0775* (2013.01)

(58) Field of Classification Search
CPC .................................................. G06K 19/0775
USPC .................................................. 600/372, 309
See application file for complete search history.

(56) References Cited

U.S. PATENT DOCUMENTS

2007/0270672 A1 11/2007 Hayter
2009/0171180 A1 7/2009 Pering
2012/0242481 A1 9/2012 Gernandt

*Primary Examiner* — Graham Smith
(74) *Attorney, Agent, or Firm* — SV Patent Service

(57) ABSTRACT

A wearable tag capable of wireless communications includes a first elastic layer, a second elastic layer over the first elastic layer, wherein the second elastic layer is embedded with a first conductive circuit. The wearable tag includes a dielectric layer on the second elastic layer, a third elastic layer on the dielectric layer, wherein the third elastic layer is embedded with a second conductive circuit, wherein the dielectric layer comprises via holes that contain electric connections between the semiconductor chip and the first conductive circuit. A semiconductor chip is in connection with the first conductive circuit and the second conductive circuit, wherein the semiconductor chip, the first conductive circuit, and the second conductive circuit are configured to wirelessly communicate with external devices. The wearable tag also includes a fourth elastic layer on the semiconductor chip.

20 Claims, 12 Drawing Sheets

STRETCHABLE MULTI-LAYER WEARABLE TAG CAPABLE OF WIRELESS COMMUNICATIONS

BACKGROUND OF THE INVENTION

The present application relates to wearable wireless electronic devices, and in particular, to tag-like or patch-like wireless devices that can adhere to human skin.

Wearable tags can communicate with smart phones and other devices using WiFi, Bluetooth, or NFC technologies. Near Field Communication (NFC) is a wireless communication standard which enables two devices in a short range to establish a communication channel within a short period of time through radio waves in the 13.56 MHz frequency range. NFC can be a useful technology for data transfer between two devices in close proximity to one another. Because it needs the two devices to be in close proximity to one another (less than 10 cm), it is more secure than other wireless technologies like Bluetooth and Wi-Fi. Hence, it can be seen as an easy and secure tool for establishing quick two-way connections for data transfer. NFC is a two-way communication tool, one of the devices/cards can have a passive NFC tag that can reduce the cost and still behave in the same way as any other RFID tag.

This communication standard is being increasingly adopted for use in wireless transactions, including money transfer, loyalty coupons, gift cards, transit passes, tickets, etc. Mobile handset manufacturing companies are increasingly integrating NFC hardware in their phones. For example, the 2014 CES badges employed NFC technology and have resulted in shorter lines, more badge functionality, and greater ease of use for attendees and exhibitors. NFC has also been increasingly used in the fields of medical devices, electronic health records, as well as wearable tagging devices.

Wearable tag (or patch) is an electronic tag that can be worn by a user. Wearable tag is required to stay on user's skin and function for an extended period of time from hours to months. A wearable tag can contain a silicon chip and antenna that can be accessed using NFC, Bluethooth, WiFi, or other technologies. An authentication wearable tag can be used as a "password" similar to a barcode. For example, it can be used to recognize a user's smart phone for authentication purpose. It can also be integrated with different sensors for other purposes such as vital signs monitoring, motion track, skin temperature measurements and ECG detection.

Despite initial development efforts, conventional wearable tags still face several drawbacks: they may not provide adequate comfort for users to wear them; they may not stay attached to user's body for the required length of time; they are usually not aesthetically appealing.

Moreover, conventional wearable tags are often not robust enough to sustain repeated elongations during the movements of the body that the wearable tags are attached to. Under stress, different layers in wearable tags can break or delaminate rendering the tags inoperable.

Another challenge to conventional wearable tags is that their conductive circuits cannot provide high quality (high Q) wireless communications. One cause for this deficiency is due to the resistance in the antenna circuits in these conventional wearable tags.

SUMMARY OF THE INVENTION

The presently disclosure attempts to address the aforementioned limitations in conventional wearable tags. The disclosed wearable tags are of high flexibility, breathability, and strength against repeated elongations.

Moreover, the disclosed wearable tags are capable of superior quality (e.g. high Q) wireless communications, and can be configured to provide single channel or multi-channels in wireless communications.

Furthermore, the disclosed wearable tags are aesthetically appealing and can stay attached to skin for long period of time.

In one general aspect, the present invention relates to a wearable tag capable of wireless communications that includes a first elastic layer; a first antenna circuit over the first elastic layer; a dielectric layer on the first antenna circuit, wherein the dielectric layer comprises via holes that contain electric connections between the semiconductor chip and the first antenna circuit; a semiconductor chip in connection with first antenna circuit, wherein the semiconductor chip and the first antenna circuit can wirelessly communicate with external devices; and a second elastic layer on the semiconductor chip.

Implementations of the system may include one or more of the following. The wearable tag can further include a third elastic layer between the first elastic layer and the dielectric layer, wherein the first antenna circuit is embedded in the third elastic layer. The wearable tag can further include a second antenna circuit on the dielectric layer, wherein the semiconductor chip is in connection with first antenna circuit and the second antenna circuit, wherein the semiconductor chip, the first antenna circuit, and the second antenna circuit are configured to wirelessly communicate with external devices. The first antenna circuit and the second antenna circuit can transmit wireless signals at substantially a same frequency range. Ends of the first antenna circuit and the second antenna circuit can be respectively electrically connected through the via holes in the dielectric layer. The first antenna circuit and the second antenna circuit can transmit wireless signals in different frequency channels, wherein the first antenna circuit and the second antenna circuit can be each separately connected to the semiconductor chip. The wearable tag can further include a fourth elastic layer on the dielectric layer, wherein the second antenna circuit can be embedded in the third elastic layer. The wearable tag can further include a strap layer made of an electrically insulating material and formed on at least a portion of the second antenna circuit, wherein the semiconductor chip can be positioned over the strap layer, wherein the semiconductor chip can be electrically connected to two ends of the second antenna circuit through holes in the strap layer. The second antenna circuit can be laid out in a coil shape, wherein the strap layer can be positioned to bridge over the second antenna circuit to allow the semiconductor chip to be electrically connected to the two ends of the second antenna circuit without shorting the second antenna circuit. The wearable tag can further include metal pads formed on the strap layer, wherein the semiconductor chip can be mounted on the metal pads, wherein the metal pads are respectively electrically connected to the two ends of the second antenna circuit. The wearable tag can further include end pads under the strap layer and respectively electrically connected to the two ends of the second antenna circuit, wherein the end pads can be electrically connected to the metal pads on the strap layer. The wearable tag can further include a logic circuit formed on or in the strap layer, wherein the logic circuit can include one or more semiconductor chips and/or electronic components comprising at least one of a capacitor, a resistor, a diode, or an inductor, wherein the one or more semiconductor chips and the electronic components can be connected by conductive lines with the metal pads. The strap layer can include: one or more holes; and a non-conductive material positioned the one or more holes and fixed to the strap layer, wherein the non-conductive material can anchor the strap layer to a fourth elastic layer in which the second antenna circuit is embedded. At least one of the first elastic layer or the second elastic layer can have a Young's Modulus lower than 0.3 Gpa. At least one of the first elastic layer or the second elastic layer can include an elastomer material. The wearable tag can further include a graphic layer formed on the first elastic layer and below the first antenna circuit, wherein the graphic layer includes a graphic pattern. The semiconductor chip and the first antenna circuit can communicate with external devices based on near field communication (NFC), Wi-Fi, Bluetooth, or RFID wireless communication standard. The wearable tag can further include a first line layer; and a release layer formed on the first liner layer, wherein the first elastic layer can be formed on the release layer. The wearable tag can further include an adhesive layer formed on the second elastic layer; and a second line layer formed on the adhesive layer.

In another general aspect, the present invention relates to a wearable tag capable of wireless communications that includes a first elastic layer; a second elastic layer over the first elastic layer, wherein the second elastic layer is embedded with a first conductive circuit; a dielectric layer on the second elastic layer; a third elastic layer on the dielectric layer, wherein the third elastic layer is embedded with a second conductive circuit, wherein the dielectric layer comprises via holes that contain electric connections between the semiconductor chip and the first conductive circuit; a semiconductor chip in connection with the first conductive circuit and the second conductive circuit, wherein the semiconductor chip, the first conductive circuit, and the second conductive circuit can wirelessly communicate with external devices; and a fourth elastic layer on the semiconductor chip.

These and other aspects, their implementations and other features are described in detail in the drawings, the description and the claims.

DETAILED DESCRIPTION OF THE INVENTION

Figure 1:
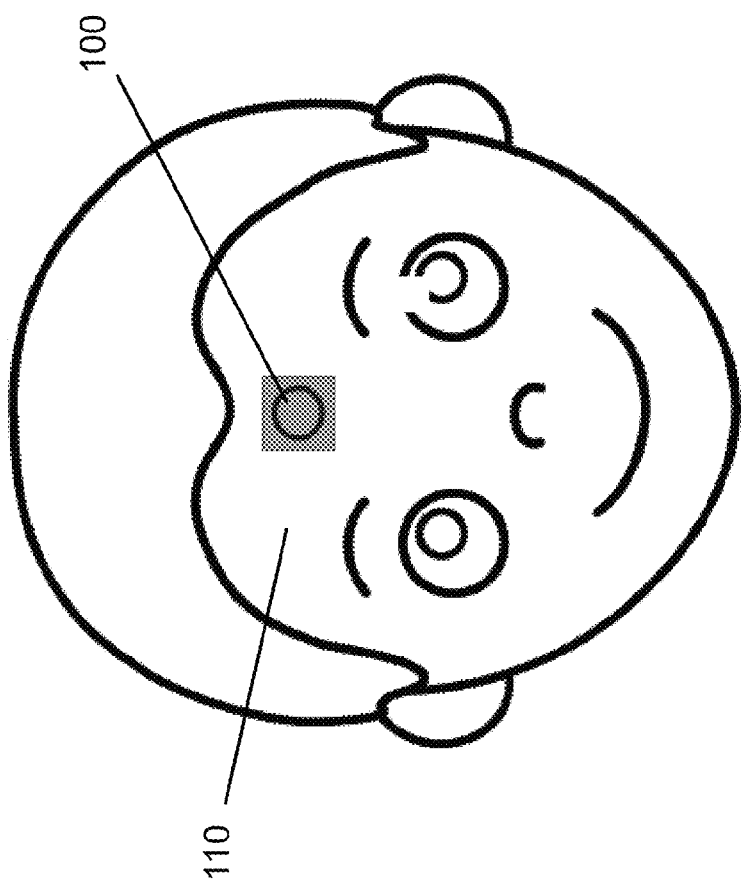
FIG. 1 illustrates the usage of a wearable tag that is attached to a user's skin.

Referring to FIG. 1, a wearable tag 100 can be placed on and adheres to a person's skin 110 on his or her such as forehead, hand, wrist, arm, shoulder, waist, leg, foot, etc.

As discussed above, there are several challenges for wearable tags on human skin. The tags need to stay on skin for an extended period enduring various daily activities such as taking showers or bathes, swimming, exercises, holding weights, etc. The tags are rubbed by clothing numerous times a day. While it is very challenging to keep Band-Aid stickers to stay on skin for a week, the wearable tags normally have much stiffer rigid substrates, which make them more easily rubbed off than Band-Aid stickers. In addition, it is also very challenging to make a patch or tag to be comfortable to the user. Ideally the patch needs to be stretchable, flexible, and breathable.

Figure 2A:
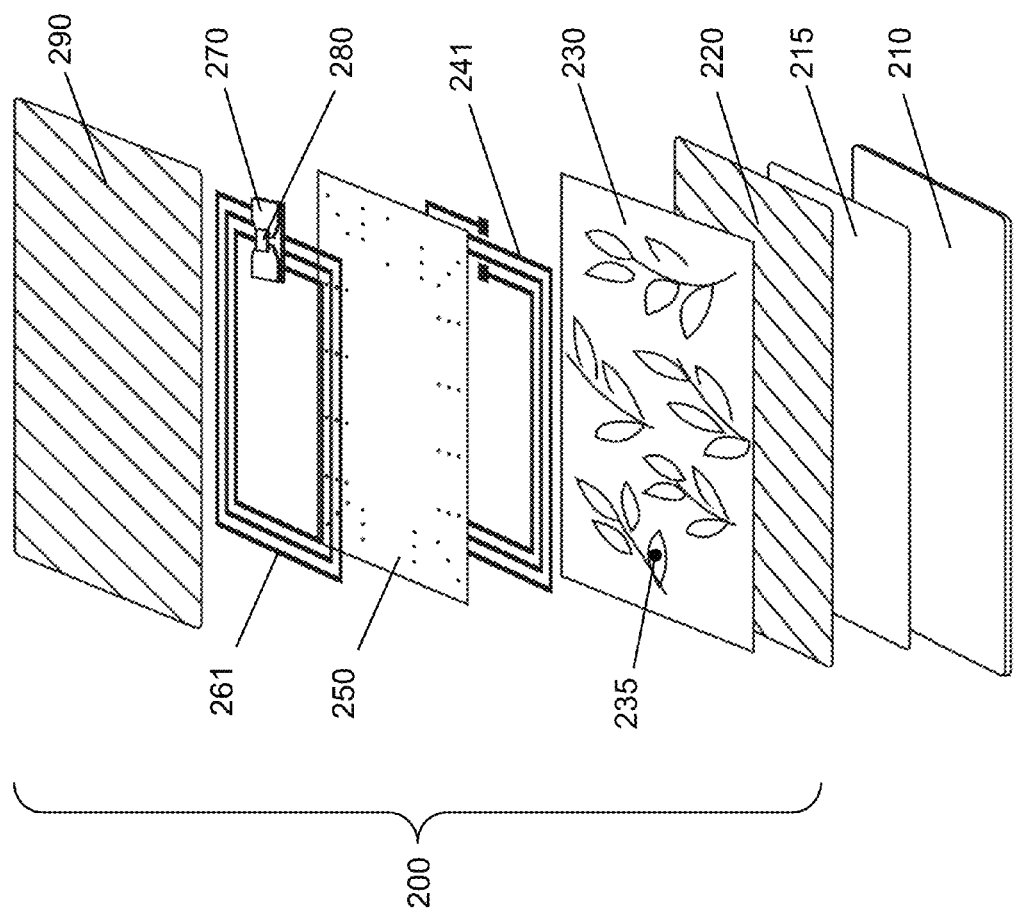
FIG. 2A is an exploded perspective view of a stretchable multi-layer wearable tag in accordance with some embodiments of the present invention.
Figure 2B:
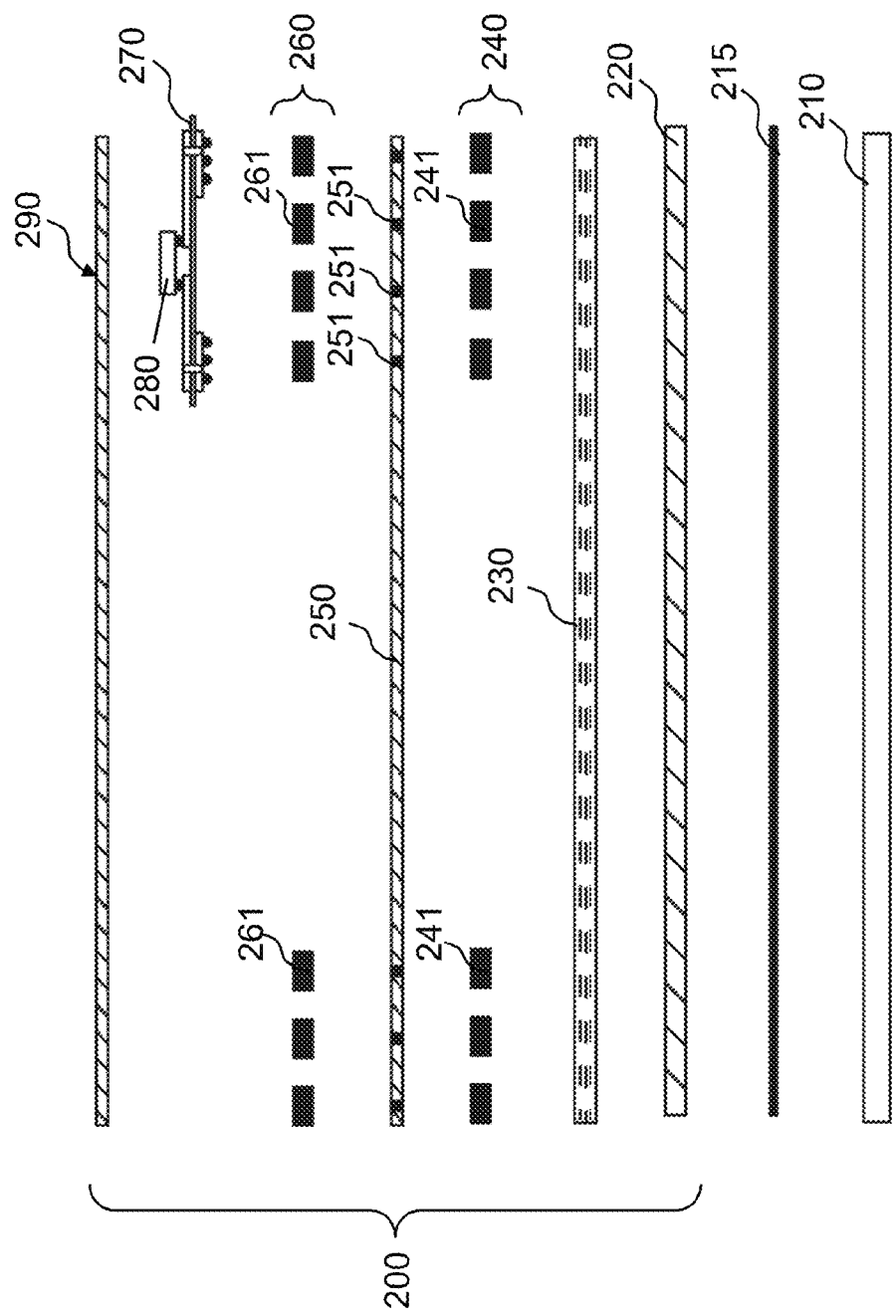
FIG. 2B is a cross-sectional view of the stretchable multi-layer wearable tag in accordance with some embodiments of the present invention.

The presently disclosure aims to overcome the drawbacks in the conventional wearable tags, and to provide a durable and comfortable wireless patch or tag. Referring to FIGS. 2A-2B, a wearable tag 200 is formed on a liner layer 210 coated with a release layer 215 on top. The wearable tag 200 includes an elastic layer 220, a graphics layer 230, an elastic layer 240 comprising an antenna circuit 241, a dielectric layer 250 comprising through via holes 251, an elastic layer 260 comprising an antenna circuit 261, a strap layer 270, a semiconductor chip 280 mounted in the strap layer 270, and an elastic layer 290.

The liner layer 210 is not required to be elastic and will be discarded after the wearable tag is applied to user's skin. The liner layer 210 can be made of a material such as Polyethylene terephthalate (PET) or paper or other similar film materials known in the art of the field. The release layer 215 can be a thin film of an elastomer material, or water-soluble adhesive, which can be slot coated or blade on the top surface of the liner layer 210.

The elastic layers 220, 240, 260, 290, and the dielectric layer 250 are intended to provide support as well as stretchability, flexibility, breathability, and durability to the wearable tag 200. The elastic layers 220, 240, 260, 290, and the dielectric layer 250 are flexible, and can conform to the skin under different moving positions, which can repeatedly elongate and compress the wearable tag 200. The elastic layers 220, 240, 260, 290, and the dielectric layer 250 are also breathable allow aspiration and moisture from the skin to be released to the environment. The elastic layers 220, 290 can be made of a viscoelastic polymeric material having low Young's modulus and high failure strain. In some embodiments, the elastic layers 220, 290 have Young's Modulus <0.3 Gpa. In some cases, the elastic layers 220, 240, 260, 290, and the dielectric layer 250 have Young's Modulus <0.1 Gpa to provide enhanced flexibility and tackability. Materials suitable for the elastic layer include elastomers, viscoelastic polymers, such as silicone, and medical grade polyurethane that is a transparent medical dressing used to cover and protect wounds with breathability and conformation to skin.

In some embodiments, the elastic layers 220 can be formed on the release layer 215 by for example a fluid delivery device such as an ink jet print head, screen printing process, or flexographic process, other layer formation methods known in the art of the field. Similarly, the elastic layers 290 can be also formed with similar techniques on the elastic layer 260, the semiconductor chip 280, and the strap layer 270.

In some embodiments, the elastic layers 220 and 290 can be formed on their respective immediate lower layers by a fluid delivery device such as an inkjet print head.

An aspect of the disclosed wearable tags is to provide aesthetic appeal to the users. The graphics layer 230, as shown in FIG. 2A, includes a graphic pattern 235. In some embodiments, the graphic pattern 235 can be formed in a central area encircled by the antenna circuits 241, 261. In some embodiments, the graphic pattern 235 can be formed in a same metal layer as one of the antenna circuit 241 or 261, thus allowing both formed in a single manufacturing process. For example, the metal layer (e.g. a copper layer) can be patterned with a mask, and etched to form the antenna coils as well as the graphic pattern 235.

In some embodiments, the graphic pattern 235 provides more than aesthetics to the wearable tag 200. The antenna circuits 241, 261 receive or transmit wireless electromagnetic signals by a LC (inductor-capacitor) circuit. When the graphic pattern 235 is made using a conductive material (such as the same metal layer from which the antenna circuits 241 is formed), the graphic pattern 235 can modify the inductance-capacitance response by producing a counter inductive eddy current in the graphic pattern 235, which can increase the stability of wireless reception and transmission, and broaden the frequency response window of the wearable tag 200.

The semiconductor chip 280 and the antenna circuits 241, 261 are configured to communicate with external devices based on NFC standard, RFID, Wi-Fi, Bluetooth, or other types of wireless communication standard. Examples of external devices include smart phones, computers, mobile payment devices, scanners and readers, medical devices, security systems, personal identification systems, etc.

The dielectric layer 250 provides electric insulation between the antenna circuits 241, 261; it can be made of materials such as a polymer material such as a stretchable elastomer which can be coated on the antenna circuit 241 and the graphics layer 230.

The antenna circuits 241, 261 can be compatible for NFC communications in a frequency range near 13.56 MHz, as described above, as well as UHF RFID at about 915 MHz, Bluetooth in 2.4 GHz or 5 GHz frequency ranges, and other types of wireless communications.

In some embodiments, the antenna circuits 241, 261 are configured to receive and transmit wireless signals at a substantially same frequency. One challenge to conventional wearable tags is that the high resistance in their antenna circuits, and associated low quality in wireless communications. The antenna circuits 241, 261 can have substantially identical shape and dimensions. The antenna circuit 241 and 261 are designed the same circuits to perform the same functions; but split into multiple layers so each layer thickness can be reduced for the similar circuit resistance. The ends of the antenna circuits 241, 261 are respectively connected by via holes 251 through holes in the dielectric layer 250. The multiple conductive antenna circuits can effectively decrease the total resistance in the wireless reception and transmission, which increases quality of wireless communication of the wireless tag 200.

Another advantage of construction of multiple thin layers of conductive circuits is its mechanical robustness comparing with one single thick layer of conductive circuit. The latter has high rigidity and sometimes easy to fracture or delaminate. The dielectric layer 250 can be made of materials such as a polymer material such as a stretchable elastomer which can be coated on the antenna circuit 241 and the graphics layer 230.

In some embodiments, the antenna circuits 241, 261 are configured to receive and transmit wireless signals at different frequencies based on same or different wireless communication standards. Each of the antenna circuits 241, 261 is separately connected to the semiconductor chip 280 which can encode and amplify for transmission, or amplify and decode received signals at separate frequencies. When configured in such manner, the wireless tag 200 can simultaneously communicate wirelessly in multiple frequency channels. Communication bandwidth can be significantly increased over conventional wearable tags. The antenna circuits can be designed with RF circuit design techniques to avoid RF interference between different frequencies.

It should be noted that the disclosed wearable tags are also compatible with three or more layers of conductive circuits (including antenna and other logic circuits) and each dielectric layer in between them, which can result in additional improved communication quality or further increased transmission data rate.

Figure 3:
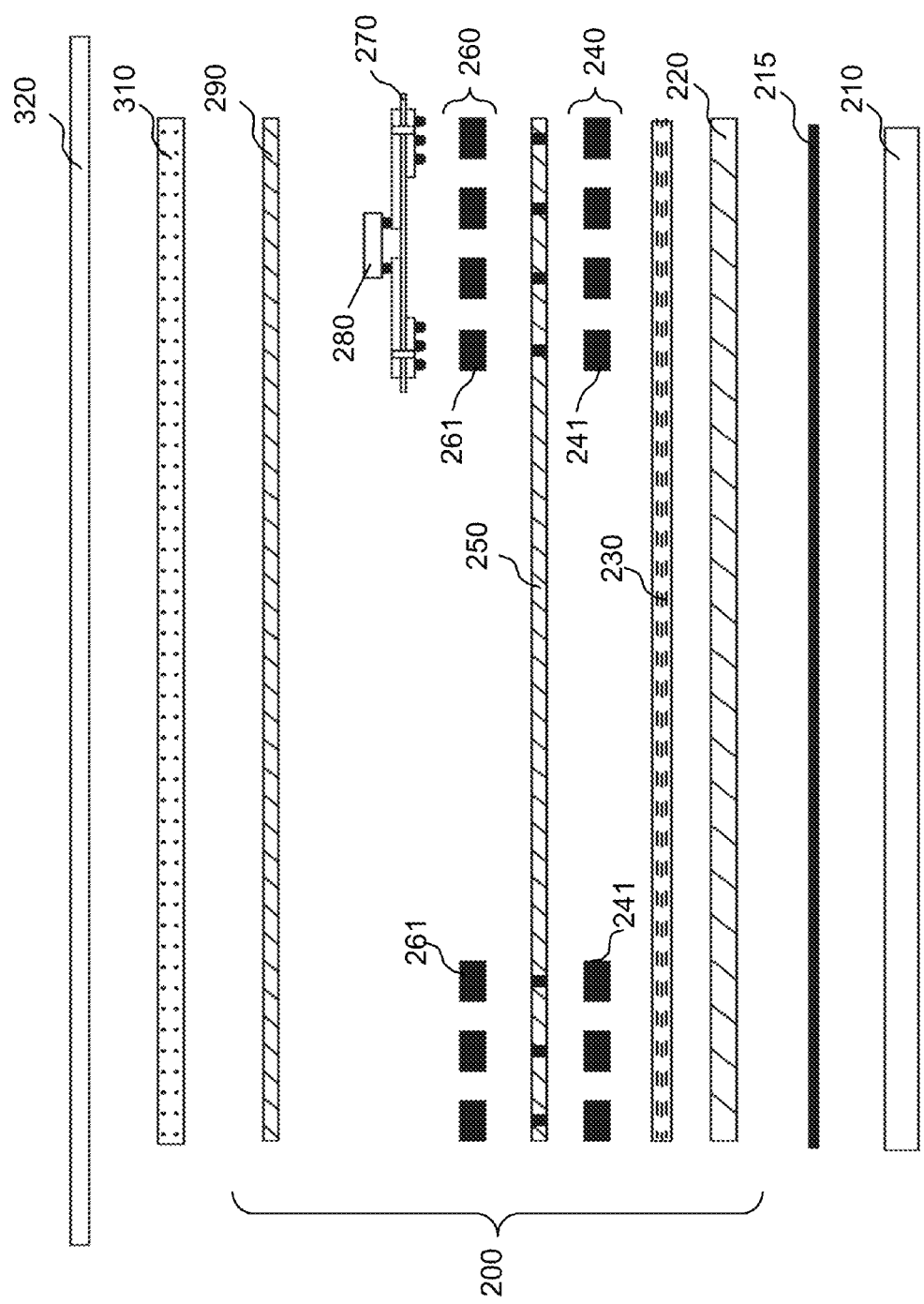
FIG. 3 is a cross-sectional view of the stretchable multi-layer wearable tag attached to an upper removable liner.

Referring to FIG. 3, an adhesive layer 310 is coated on the elastic layer 290. Another liner layer 320 is placed on the adhesive layer 310. The liner layer 320 is used for protecting the wearable tag during transportation and ease of handling of the wearable tag before usage. The adhesive layer 310 can be pressure sensitive, that is, it allows the wearable tag 100 tightly adhere to human skin under pressure, applied for example by a thumb. For instance, the adhesive layer 310 can be made of a medical pressure sensitive adhesive. An example of such adhesive is medical grade tackified Hypoallergenic Pressure Sensitive Adhesive.

Figure 4:
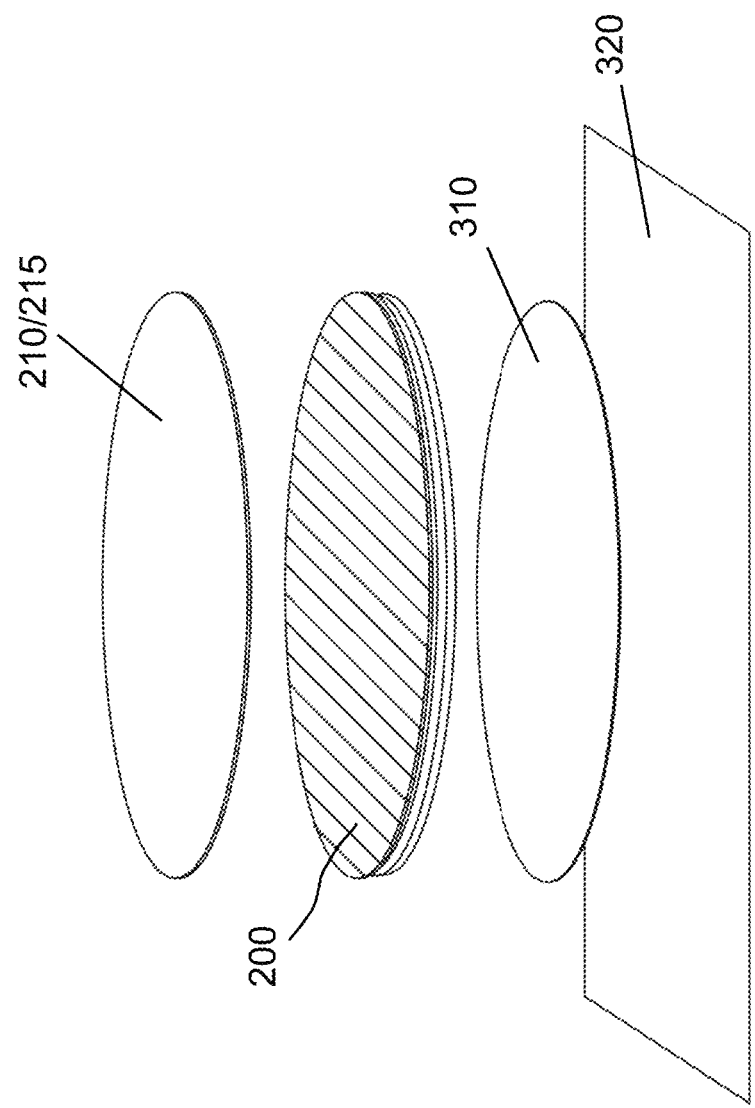
FIG. 4 is an exploded perspective view of the stretchable multi-layer wearable tag after it is cut into final product shape.

Finally, referring to FIGS. 3 and 4, the assembly of the wearable tag 200 is cut, for example, by a precision kiss die cut, to a final product shape such as a round shape for a wearable tag. One or multiple wearable tags 200 can be adhered to the liner layer 320 with their respective adhesive layers 310. At the application, the wearable tag 200 is peeled off from the liner layer 320 and is flipped and adhered to a user's skin 110 (FIG. 1) by pressure. In use, the elastic layer 290 is in full contact with the user skin 110 (FIG. 1) through a thin layer of pressure sensitive in the adhesive layer 310. The liner layer 210 together with the release coating layer 215 can be either peeled off if it is PET type liner or water soaked like temporary tattoo; then and discarded to expose the elastic layer 220 as the outer surface of the wearable tag 200 away of the user skin 110 (FIG. 1). The elastic layer 220 can transparent or semi-transparent, which allows graphic patterns in the graphic layer 230 to be visible from outside through the elastic layer 220.

The elastic layers 220, 290 can reduce the impact of rubbing force on the rigid dry inlay layer underneath, which provides better protection to the semiconductor chip 280 and the antenna circuits 241, 261. The elastic layers 220, 240, 260, 290 are resilient to starching and compressing during wearer's body movement. Thus, the elastic layers 220, 240, 260, 290 can reduce the probability of falling off, thus increasing the life span of the wearable tag 200.

Another aspect of the disclosed wearable tags is to provide breathability to wearer's skin. One drawback of the conventional wearable tags is that the rigid polymer substrate does not allow much breathability to the skin. The build-up of seat and moisture can cause discomfort and irritation to the skin, especially after wearing it for an extended period of time. In the disclosed wearable tag 200, the elastic layers 220, 240, 260, 290, and the dielectric layer 250 can be made of stretchable and breathable materials such as polyurethane, or silicone.

Figure 5:
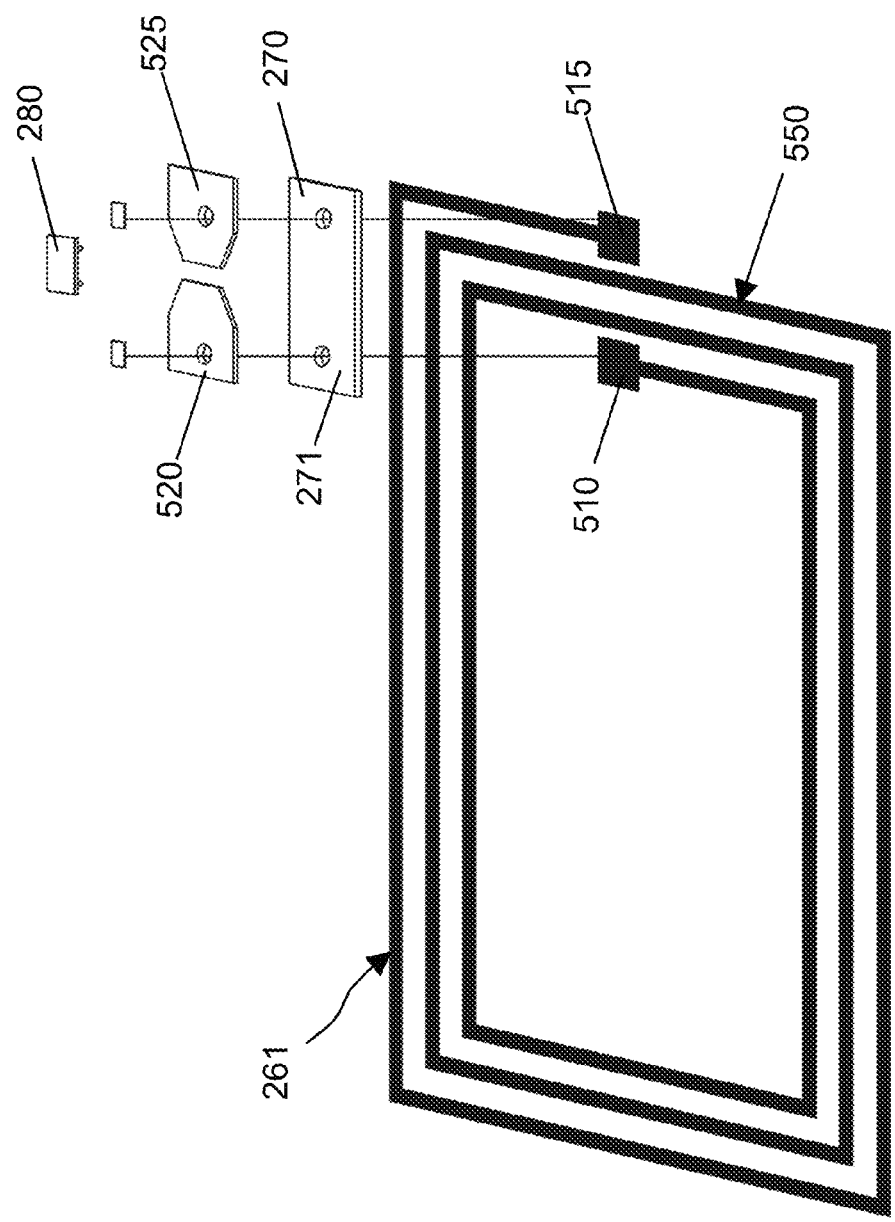
FIG. 5 is an exploded perspective view showing the exemplified relative positions of an antenna circuit, a strap layer, metal pads, and a semiconductor chip in multiple layers in the stretchable multi-layer wearable tag.
Figure 6A:
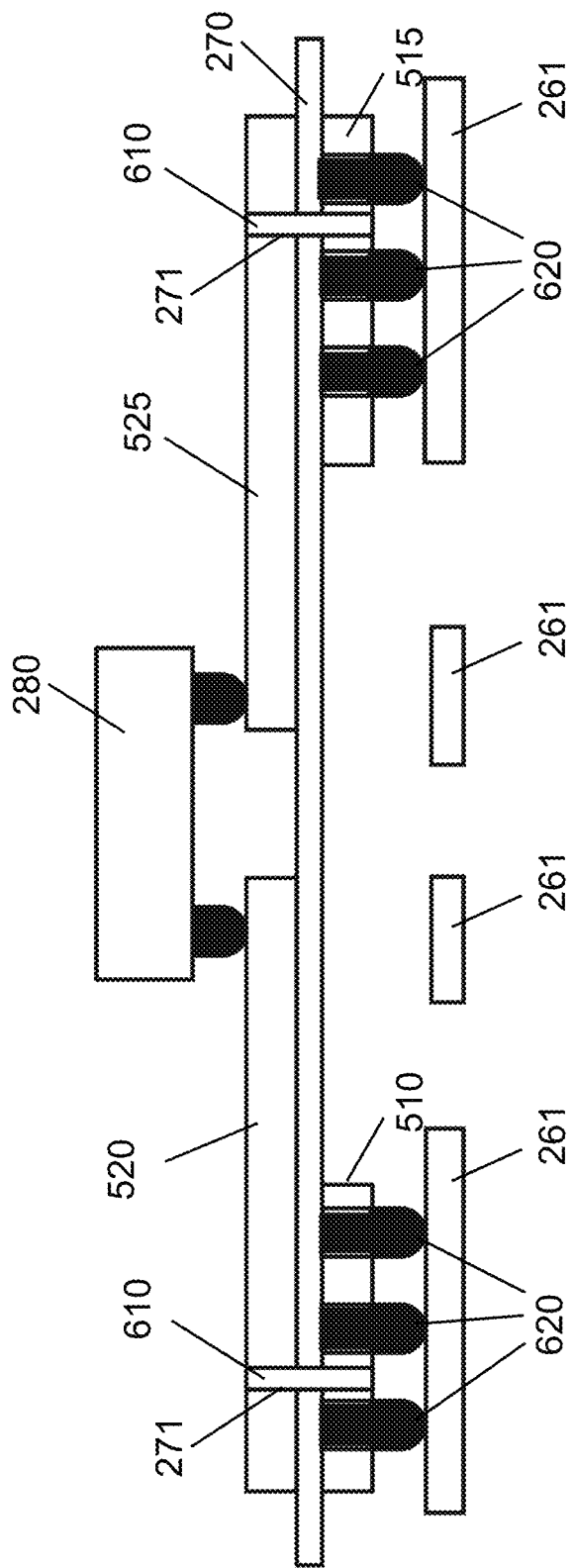
FIGS. 6A and 6B are cross-sectional views of exemplified electric connections strap that can be used to connect between an antenna circuit and a semiconductor chip in multiple layers in the stretchable multi-layer wearable tag.
Figure 6B:
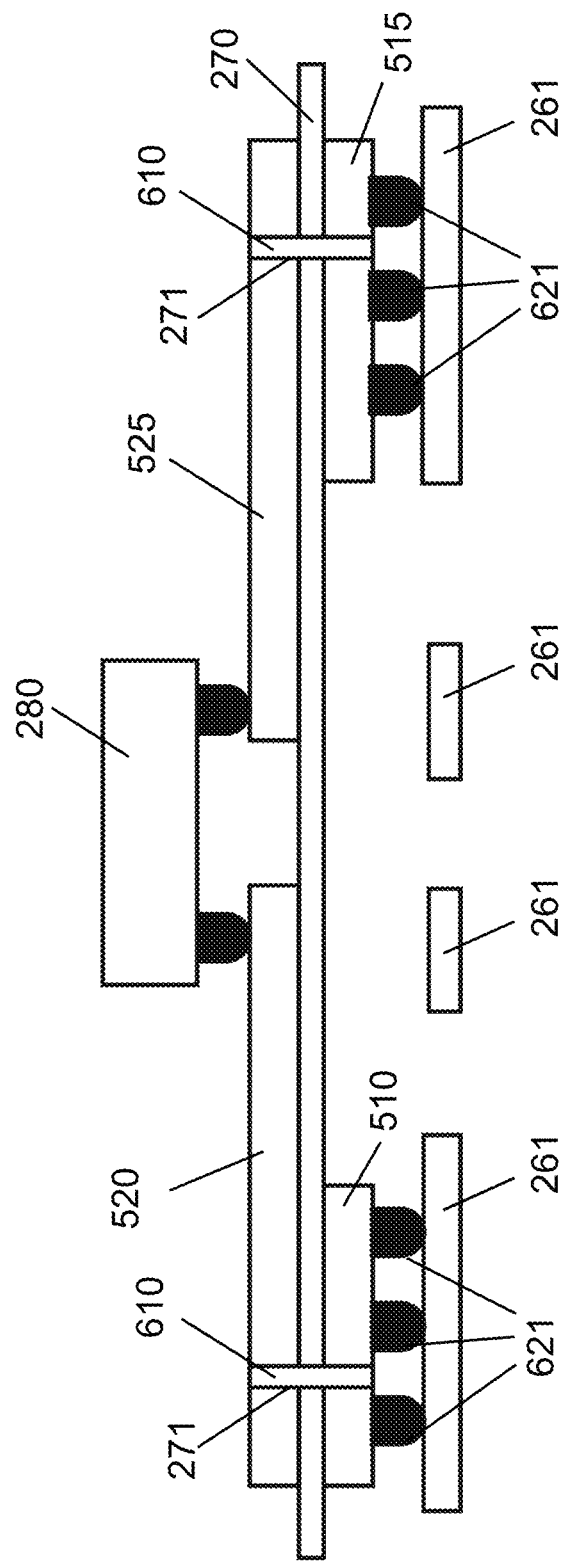

In order to receive and transmit wireless signals, as in the example of a wearable NFS tag, the semiconductor chip 280 needs to be connected to the ends of each of the antenna circuits 241, 261. Referring to FIGS. 5-6B, the antenna circuit 261 is wound several rounds in a coil 550. The semiconductor chip 280 is required to connect to conductive end pads 510, 515 without shorting the antenna circuit 261. The semiconductor chip 280 is mounted on metal pads 520, 525. The strap layer 270 is formed by an electrically insulating material. The strap layer 270 is positioned to bridge over a portion of the coil 550 in the antenna circuit 261, which separates and insulates the antenna circuit 261 from the metal pads 520, 525. The strap layer 270 includes holes 271. A conductive material 610 such as silver paste is filled into the holes 271 to electrically connect the metal pads 520, 525 and the end pads 510, 515.

The end pads 510, 515 are connected to the antenna circuit 261 with conductive bumps 620 which are anchored through the end pads 510, 515 (FIG. 6A) or conductive bumps 621 which are on formed on the surface of the end pads 510, 515 (FIG. 6B). These bumps have close physical contact with circuit end pads 510 and 515. These bumps are allowed to move within the plane without losing electric connections to the end pads 510 and 515 under lamination pressure.

Figure 7:
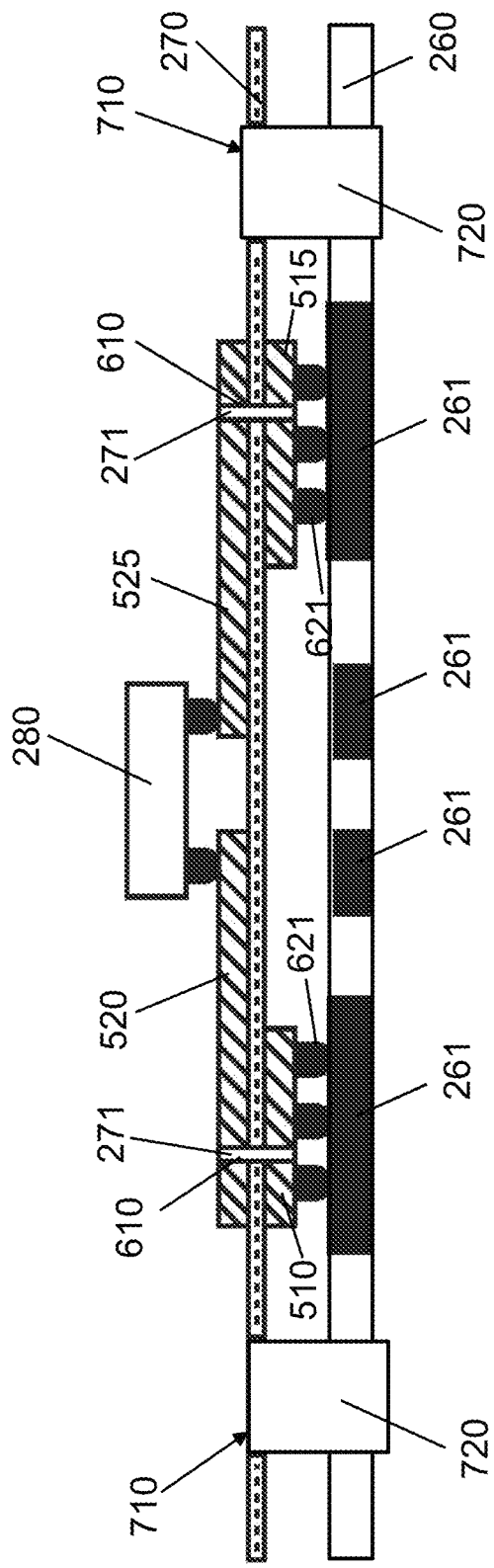
FIG. 7 is a cross-sectional view showing anchoring of a semiconductor chip and a strap layer to the elastic layer underneath in a multi-layer wearable tag.

In some embodiments, referring to FIG. 7, the strap layer 270 further includes holes 710 that can be used to pass through a non-conductive material 720 that can be fixed to the strap layer 270 at one end and anchored or tethered to one or more elastic layers (e.g. 260) underneath on the other end. The anchoring allows the semiconductor chip 280, and the metal pads 520, 525 to be fixed place when the wearable tag 200 is under stress. The anchoring can have some elasticity to give some slack to allow some adaptive movement of the semiconductor chip 280, and the metal pads 520, 525 relative to the shear rubbing forces. The benefit of this anchoring is stronger electronic circuit connections and thus more robust wearable tag comparing to conventional systems.

Figure 8:
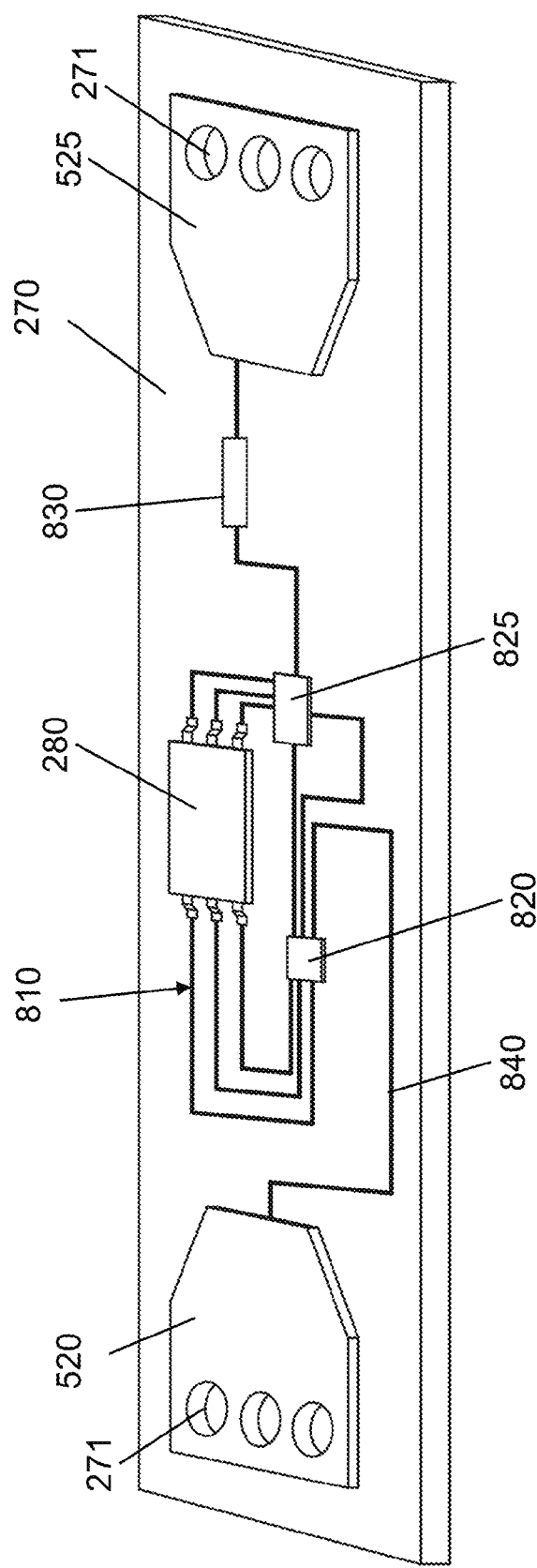
FIG. 8 shows electronic devices and conductive circuit in an elastic strap layer compatible with the stretchable multi-layer wearable tag in accordance with some embodiments of the present invention.

In some embodiments, referring to FIG. 8, a logic circuit 810 can be formed on or in the strap layer 270. The logic circuit 810 can include multiple semiconductor chips 280, 820, 825, electronic components 830 (which can be capacitor, inductor, resistor, etc.), which are connected by conductive lines 840 between the metal pads 520, 525.

Figure 9:
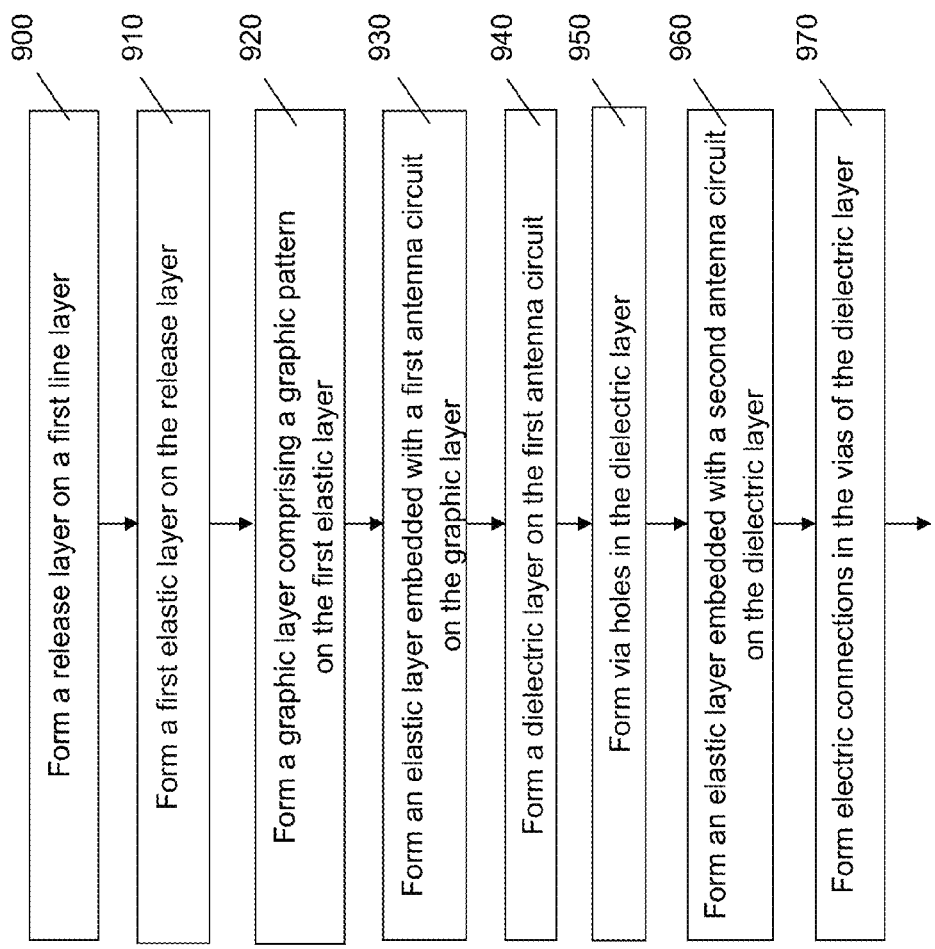
FIG. 9 is an exemplified flowchart for manufacturing the stretchable multi-layer wearable tag in accordance with the present invention.
Figure 9:
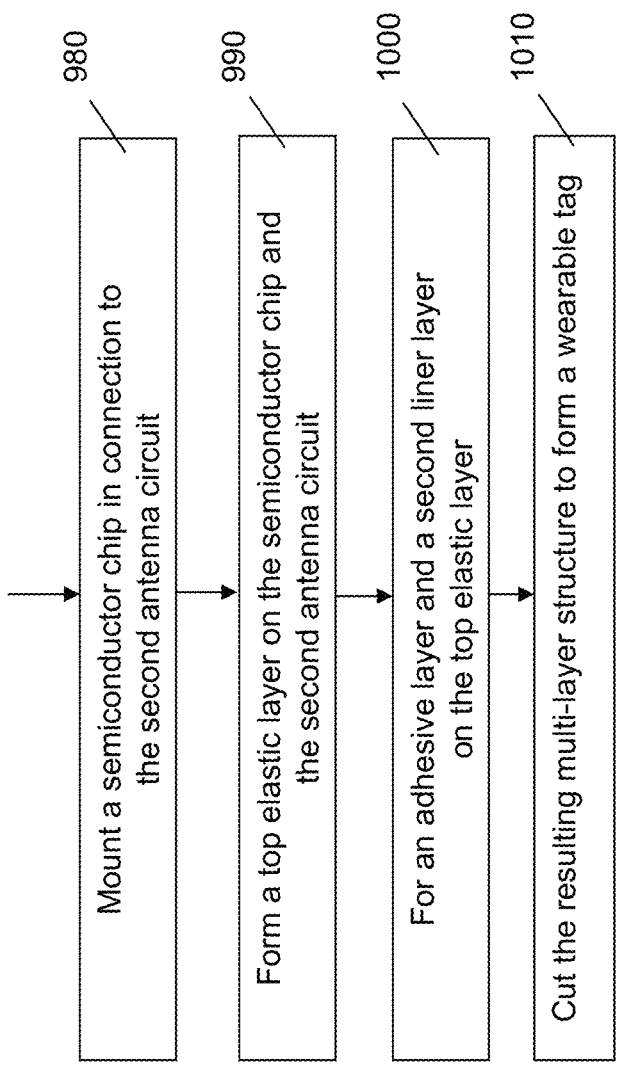

Referring to FIG. 9, the disclosed wearable tag can be manufactured by the exemplified process below. A release layer is formed on a first line layer (step 900). A first elastic layer is then formed on the release layer (step 910). A graphic layer comprising a graphic pattern is formed on the first elastic layer (step 920). An elastic layer embedded with a first antenna circuit is formed on the graphic layer (step 930). A dielectric layer is formed on the first antenna circuit (step 940). Form via holes in the dielectric layer (step 950). An elastic layer embedded with a second antenna circuit is formed on the dielectric layer (step 960). Electric connections are then formed in the via holes of the dielectric layer (step 970). One or more semiconductor chips are mounted in connection to the second antenna circuit (step 980), which includes mounting the one or more semiconductor chips on metal pads on an insulating strap layer. The strap layer is formed on the second antenna circuit. The semiconductor chip is electrically connected to the ends of the second antenna circuit without contacting and shorting the second antenna circuit. A top elastic layer is formed on the semiconductor chip and the second antenna circuit (step 990). A multi-layer structure comprising more than two conductive layers separated by dielectric layers can be repeatedly formed using steps 910-990. As discussed in relation to FIG. 3 above, an adhesive layer and a second liner layer can be formed on the top elastic layer for protecting the wearable tag during transportation and ease of handling of the wearable tag before usage (step 1000). The resulting multi-layer structure is cut to form a wearable tag (step 1010).

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the usages of the disclosed wearable tags are not limited by the examples given above; they can be applicable to many other fields. The materials suitable for the different layers of the wearable tags are also not limited by the examples provided. The layouts and forms of the elastic layer, the breathing holes, the decorative pattern, the semiconductor chip, the antenna, the metal pads, and the connection leads can have other configurations without deviating from the present invention.

What is claimed is:

1. A wearable tag capable of wireless communications, comprising:
   a first elastic layer;
   a first antenna circuit over the first elastic layer;
   a dielectric layer on the first antenna circuit, wherein the dielectric layer comprises via holes that contain electric connections between the semiconductor chip and the first antenna circuit;
   a semiconductor chip in connection with first antenna circuit, wherein the semiconductor chip and the first antenna circuit are configured to wirelessly communicate with external devices; and
   a second elastic layer on the semiconductor chip.

2. The wearable tag of claim 1, further comprising:
   a third elastic layer between the first elastic layer and the dielectric layer, wherein the first antenna circuit is embedded in the third elastic layer.

3. The wearable tag of claim 1, further comprising:
   a second antenna circuit on the dielectric layer, wherein the semiconductor chip is in connection with first antenna circuit and the second antenna circuit, wherein the semiconductor chip, the first antenna circuit, and the second antenna circuit are configured to wirelessly communicate with external devices.

4. The wearable tag of claim 3, wherein the first antenna circuit and the second antenna circuit are configured to transmit wireless signals at substantially a same frequency range.

5. The wearable tag of claim 4, wherein ends of the first antenna circuit and the second antenna circuit are respectively electrically connected through the via holes in the dielectric layer.

6. The wearable tag of claim 3, wherein the first antenna circuit and the second antenna circuit are configured to transmit wireless signals in different frequency channels, wherein the first antenna circuit and the second antenna circuit each is separately connected to the semiconductor chip.

7. The wearable tag of claim 3, further comprising:
a fourth elastic layer on the dielectric layer, wherein the second antenna circuit is embedded in the fourth elastic layer.

8. The wearable tag of claim 3, further comprising:
a strap layer made of an electrically insulating material and formed on at least a portion of the second antenna circuit, wherein the semiconductor chip is positioned over the strap layer, wherein the semiconductor chip is electrically connected to two ends of the second antenna circuit through holes in the strap layer.

9. The wearable tag of claim 8, wherein the second antenna circuit is laid out in a coil shape, wherein the strap layer is positioned to bridge over the second antenna circuit to allow the semiconductor chip to be electrically connected to the two ends of the second antenna circuit without shorting the second antenna circuit.

10. The wearable tag of claim 8, further comprising:
metal pads formed on the strap layer, wherein the semiconductor chip is mounted on the metal pads, wherein the metal pads are respectively electrically connected to the two ends of the second antenna circuit.

11. The wearable tag of claim 10, further comprising:
end pads under the strap layer and respectively electrically connected to the two ends of the second antenna circuit, wherein the end pads are electrically connected to the metal pads on the strap layer.

12. The wearable tag of claim 10, further comprising:
a logic circuit formed on or in the strap layer, wherein the logic circuit comprises one or more semiconductor chips and/or electronic components comprising at least one of a capacitor, a resistor, a diode, or an inductor, wherein the one or more semiconductor chips and the electronic components are connected by conductive lines with the metal pads.

13. The wearable tag of claim 8, wherein the strap layer comprises:
one or more holes; and
a non-conductive material positioned in the one or more holes and fixed to the strap layer, wherein the non-conductive material is configured to anchor the strap layer to a fourth elastic layer in which the second antenna circuit is embedded.

14. The wearable tag of claim 1, wherein at least one of the first elastic layer or the second elastic layer has a Young's Modulus lower than 0.3 Gpa.

15. The wearable tag of claim 1, wherein at least one of the first elastic layer or the second elastic layer comprises an elastomer material.

16. The wearable tag of claim 1, further comprising:
a graphic layer formed on the first elastic layer and below the first antenna circuit, wherein the graphic layer includes a graphic pattern.

17. The wearable tag of claim 1, wherein the semiconductor chip and the first antenna circuit are configured to communicate with external devices based on near field communication (NFC), Wi-Fi, Bluetooth, or RFID wireless communication standard.

18. The wearable tag of claim 1, further comprising:
a first line layer; and
a release layer formed on the first liner layer, wherein the first elastic layer is formed on the release layer.

19. The wearable tag of claim 1, further comprising:
an adhesive layer formed on the second elastic layer; and
a second line layer formed on the adhesive layer.

20. A wearable tag capable of wireless communications, comprising:
a first elastic layer;
a second elastic layer over the first elastic layer, wherein the second elastic layer is embedded with a first conductive circuit;
a dielectric layer on the second elastic layer;
a third elastic layer on the dielectric layer, wherein the third elastic layer is embedded with a second conductive circuit, wherein the dielectric layer comprises via holes that contain electric connections between the semiconductor chip and the first conductive circuit;
a semiconductor chip in connection with the first conductive circuit and the second conductive circuit, wherein the semiconductor chip, the first conductive circuit, and the second conductive circuit are configured to wirelessly communicate with external devices; and
a fourth elastic layer on the semiconductor chip.

* * * * *